United States Patent
Bourbonnais et al.

(10) Patent No.: US 9,875,266 B2
(45) Date of Patent: *Jan. 23, 2018

(54) RESTORING DATABASE CONSISTENCY INTEGRITY

(71) Applicant: International Business Machines Corporation, Armonk, NY (US)

(72) Inventors: Serge Bourbonnais, Palo Alto, CA (US); Austin F. M. D'Costa, Beaverton, OR (US); You-Chin Fuh, San Jose, CA (US); James Z. Teng, San Jose, CA (US); Tyrone Yu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 504 days.

This patent is subject to a terminal disclaimer.

(21) Appl. No.: 14/633,592

(22) Filed: Feb. 27, 2015

(65) Prior Publication Data

US 2015/0254298 A1 Sep. 10, 2015

Related U.S. Application Data

(63) Continuation of application No. 14/199,370, filed on Mar. 6, 2014.

(51) Int. Cl.
*G06F 17/30* (2006.01)
*G06F 11/14* (2006.01)
*G06F 11/20* (2006.01)

(52) U.S. Cl.
CPC .... *G06F 17/30339* (2013.01); *G06F 11/1474* (2013.01); *G06F 11/2094* (2013.01);
(Continued)

(58) Field of Classification Search
CPC .......... G06F 11/1474; G06F 17/30353; G06F 17/30371; G06F 17/30377; G06F 2201/82
See application file for complete search history.

(56) References Cited

U.S. PATENT DOCUMENTS

2007/0022144 A1   1/2007   Chen
2007/0061379 A1*  3/2007   Wong ................ G06F 17/30575
                                                707/999.201
(Continued)

FOREIGN PATENT DOCUMENTS

EP           0549325 A2      6/1993

OTHER PUBLICATIONS

Brooks, C. et al.; "IBM System Storage: Planning for Heterogeneous IT Business Continuity"; IBM Corporation; www.ibm.com/redbooks/redp406301-00; 2007. pp. 1-24.
(Continued)

*Primary Examiner* — Dinku Gebresenbet
(74) *Attorney, Agent, or Firm* — Mollborn Patents, Inc.; Fredrik Mollborn

(57) ABSTRACT

Techniques for restoring point-in-time and transaction consistency across consistency groups between a first and a second independent database management system (DBMS) for a disaster recovery. Several consistency groups (CGs) are defined for replication. For each CG in the first DBMS data changes are transmitted to a second DBMS. A timestamp representing a most recently received commit log record or a heartbeat during periods of inactivity for a CG is stored in a database table at regular intervals. At regular intervals, the timestamp is compared with timestamps for other CGs to identify a common time at which data to be applied to the CGs in the second DBMS have been received into a recoverable data store. The received data is applied to the CGs in the second DBMS up to the common time.

9 Claims, 2 Drawing Sheets

(52) U.S. Cl.
CPC .. *G06F 17/30575* (2013.01); *G06F 17/30578* (2013.01); *G06F 2201/80* (2013.01); *G06F 2201/82* (2013.01); *G06F 2201/835* (2013.01)

(56) References Cited

U.S. PATENT DOCUMENTS

| | | | |
|---|---|---|---|
| 2008/0208919 A1* | 8/2008 | i Dalfo | G06F 17/30578 707/999.201 |
| 2012/0102006 A1 | 4/2012 | Larson et al. | |
| 2012/0109895 A1 | 5/2012 | Zwilling et al. | |
| 2012/0290547 A1 | 11/2012 | Kamimura et al. | |

OTHER PUBLICATIONS

Osuna, A. et al.; "Planning for the Unplanned: DB2 9 Disaster Recovery with IBM System Storage N Series"; IBM Corporation; www.ibm.com/redbooks/redp442500-00; 2008. pp. 1-28.

USPTO Office Action. U.S. Appl. No. 14/199,370, dated May 5, 2017.

USPTO Office Action. U.S. Appl. No. 14/199,370, dated Oct. 6, 2016.

* cited by examiner

MCGSYNC (at most one row per consistency group) - One such table per DBMS data sharing group
An entry in this table indicates a Consistency Group that participates to the workload.

| MCGNAME varchar(64) | REPQMAPNAME varchar(64) | APPLY_SCHEMA varchar(30) | UPDATE_TIME timestamp | MAX_CMT_SEQ_READ varchar(16) for bit data not null | MAX_CMT_TIME_READ bigint | OLDEST_TRANS bigint | STATE char(1) |
|---|---|---|---|---|---|---|---|
| WORKLOAD1 | A2B | ASN1 | 9:09:00 | x'00000000000000000' 0 on startup | 9:05:00 | 9:04:00 | 'A' |

... continued

| STATE_CHANGE_TIME timestamp | UPDATE_TIME timestamp | NUM_TRANS int | NUM_MSGS int | NEXT_APPLYUPTO_TIME bigint |
|---|---|---|---|---|
| 7:56:00 | 9:09:00 | 5000 | 5000 | 9:04:00 |

RESTORING DATABASE CONSISTENCY INTEGRITY

BACKGROUND

The present invention relates to database management system (DBMS) configurations, and more specifically to active/active DBMS configurations, where two or more DBMS are kept synchronized using log-capture/transaction replay replication technology. In such a configuration, the DBMSs are fully active and independent of each other. Database transactions do not require any locking or coordination across DBMSs. Instead, captured log records in one DBMS are transformed into data manipulation language statements that are executed at each target. Each replication Consistency Group (CG) may use a different transmission path and different replication programs, all operating in parallel, with the potential for failing independently.

An Active/Active configuration provides Continuous Availability (CA) throughout planned maintenance, outages, and disaster. Maintenance activities include system, hardware, or software upgrades, migrations, and deployments. Outages can be caused by component failure, performance degradation due to system overload. Disasters involve unrecoverable data loss, which might be caused by the loss of a site, following a catastrophe, such as a flood, earthquake, etc. In order to ensure availability, typically one or more hot failover sites are kept synchronized with a primary site using software replication and are used for switching applications during unavailability of the primary site for these applications, or following a disaster. Applications transactions can run at any site, but are generally routed to one site at a time in a manner that avoids change conflicts, particularly if and when such transactions involve monetary transfers.

Existing replication technologies often replicate data with eventual consistency semantics, transmitting and applying changes in parallel to a target. While eventual consistency may be suitable for a large number of read-only applications, this may not be the case for disaster recovery, as it under certain circumstances might leave the target in an inconsistent and unrecoverable state. Often users have to resort to business processes to reconcile the database transactions following a disaster, which a costly and error-prone process, or rely on disk replication technologies following a disaster, which may require significant time and efforts. Thus, improved methods are needed for dealing with disaster recovery.

SUMMARY

The various embodiments of the present invention provide methods for restoring transaction consistency across consistency groups between a first and a second independent database management system for a disaster recovery. Several consistency groups are defined. Each consistency group in the first database management system uses a separate transmission channel to transmit data changes pertaining to the consistency group to a corresponding consistency group at the second database management system. A timestamp is identified in response to the second database management system having received data from log records from the first database management system. The timestamp represents a most recently received commit log record. The timestamp is stored in a database table. The timestamp is compared with timestamps for other consistency groups to identify a lowest common commit point representing a common time at which data to be applied to the consistency groups in the second database management system have been received into a recoverable data store. The received data is applied to the consistency groups in the second database management system up to the identified lowest common commit point.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

FIG. 2 shows a more detailed view of a MSGSYNC table, in accordance with one embodiment.

Like reference symbols in the various drawings indicate like elements.

DETAILED DESCRIPTION

Figure 1:
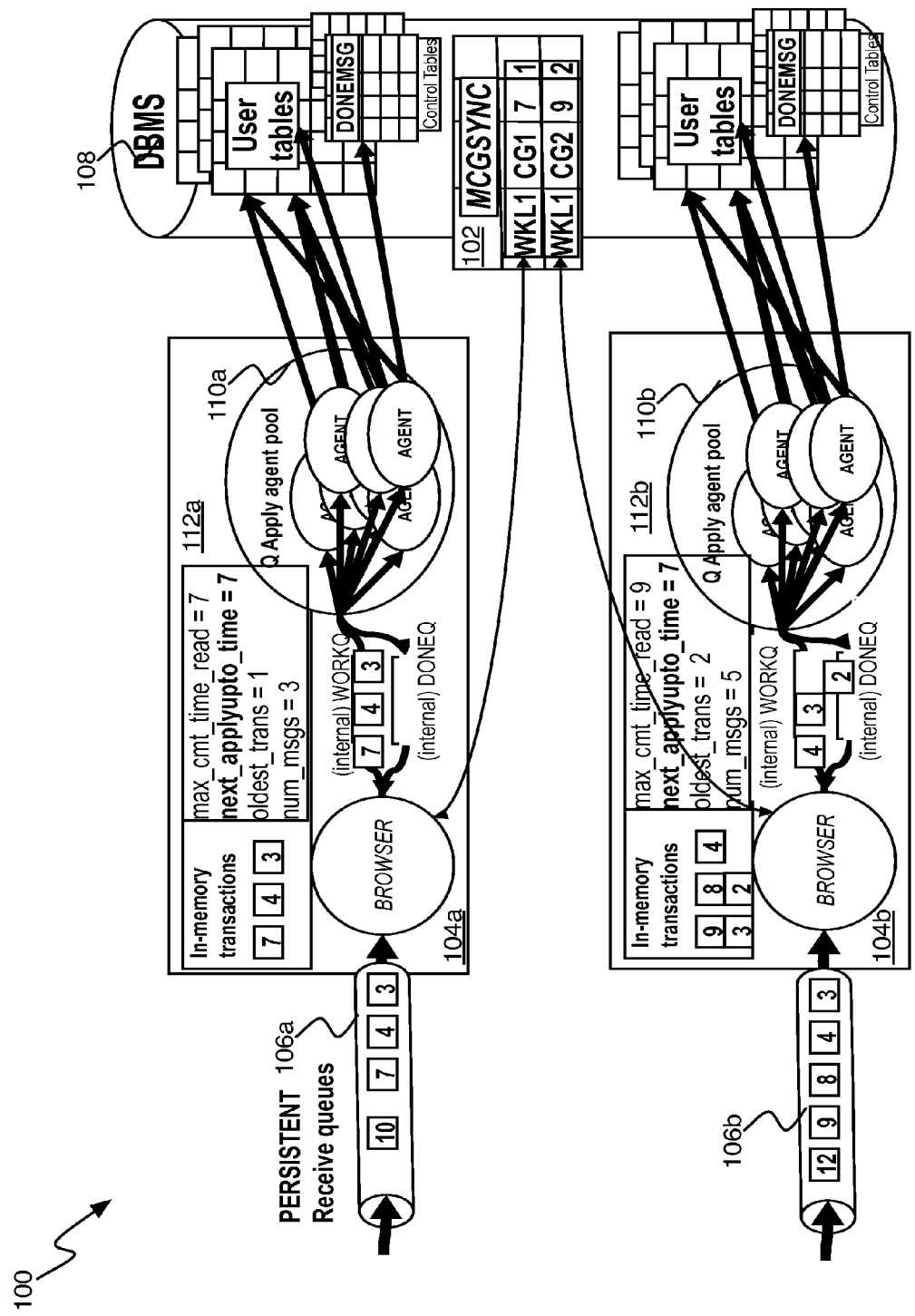
FIG. 1 shows a schematic view of a system for ensuring transaction consistency at failover after a disaster, in accordance with one embodiment.

The various embodiments of the invention described herein provide techniques for ensuring that database transaction consistency can be restored to a point-in-time after a disaster for multi-site Active/Active databases, which are kept synchronized by log capture and parallel transaction replay replication with eventual consistency semantics, and transmitting data over multiple independent channels, for scalability or for reflecting application data partitioning. Control over latency variance among consistency groups is provided. Furthermore, synchronization points are provided across all CGs, which can be used for backing out already applied changes in a target DBMS to a common consistent timestamp, thus allowing for point-in-time disaster recovery of an entire computer system complex, when multiple replication techniques are combined for disaster recovery.

Using these techniques may greatly help in restoring consistency if and when multiple transmission channels are used for scalability, and one of these channels fails, and may also greatly help in meeting the necessary business requirements of:
1. Short Recovery Time Objective (RTO)—seconds or at most a few minutes for restoring business;
2. Small Recovery Point Objective (RPO)—at most a few seconds of data loss;
3. Long distance between recovery sites—hundreds, or even thousands of miles;
4. Very small or no impact on application response time.

Various embodiments of the invention will now be described with reference to the figures. In one embodiment, the DBMS is a relational database management system (RDBMS) and a table structure is used for communicating between apply programs. This is possible, when all tables reside in the same DBMS, which can be a multiple system data sharing architecture, such as an Oracle RAC (available from Oracle Corporation of Redwood City, Calif.) or an IBM parallel Sysplex (available from International Business Machines Corporation of Armonk, N.Y.). In another embodiment, when the data and apply programs reside in different DBMS on a shared data parallel system, such as IBM parallel Sysplex, shared data structures in the coupling facility can be used for communication between cooperating apply programs. In the following description, it will be assumed that the database is a relational database, but as the skilled person realizes, these concepts can be implemented on any type of DBMS that is kept synchronized using transaction replay in an active/active environment. In another embodiment, the synchronization protocol uses messages for coordination, allowing recovery support for replication of distributed transactions across a cluster of a DBMS, replicated to another cluster. Thus, the description is not limited to RDBMSs only.

The concept of Consistency Groups (CGs) is used throughout this specification. A CG is a grouping of all system, middleware, and application volumes that are required to be managed as a consistent entity. CGs enable customers to group 'related volumes' together representing a "business transaction" that may involve multiple transactions across a single or multiple databases/file systems located on a single or multiple heterogeneous server platform.

For block/record-based data replication techniques, the CGs ensure that the alternate physical image of the data across the entire CG is maintained. CGs enable databases to perform a database RESTART function, which examines the DB logs and tables, backing out "in flight" and "in doubt" transactions, making the DB transaction consistent. Depending on the application, this may or may not be enough. A "business transaction" may involve a single or multiple transactions across a single or multiple applications. Thus, the recovery process at a "business transaction" level may require multiple levels of application restarts in which each may involve a single or multiple database and/or file system restart. The scope of "business transactions" may be across a single or multiple servers and operating system platforms.

It is imperative that these "dependent writes" be written to disk in a sequence that preserves dependencies (e.g., a new record must be inserted before it is updated). Furthermore, there is no guarantee that the database log and the database itself reside on the same device or even in the same storage subsystem. Failure to execute the write sequence correctly may result in a data corruption. Thus, maintaining "dependent write I/O consistency" through the use of appropriate CGs is a critical component in all data replication products. Ensuring Transaction Consistency at Failover after a Disaster FIG. 1 shows a schematic view of a system (100) for ensuring transaction consistency at failover after a disaster, in accordance with one embodiment. As can be seen in FIG. 1, and as is shown in further detail in FIG. 2, a table MSGSYNC (102) keeps a timestamp of a latest syncpoint, a next target syncpoint, and an apply timestamp for each CG. In one embodiment, each DBMS data sharing group has one MSGSYNC table (102), each CG that participates to the workload for the application has one row in the MSGSYNC table (102), and the syncpoint interval is provided in milliseconds. It is the application that modifies the MSGSYNC table (102), as well as other tables, across all CGs.

The Apply process for each CG selects the minimum common syncpoint timestamp from the MSGSYNC table (102) and proceeds only when this timestamp is greater than transactions that are ready to be applied by for this CG. That is, data is not applied for a CG, unless a common consistency point has been determined and transactions up to that consistency point have been persisted across all CGs for all channels. This consistency point is a common point at which all transactions have been safely received, with the ability to recover in case of failure, but at which the transactions have not yet been applied. In the implementation shown in FIG. 1, that is, when queue based replication is used, the messages are persisted on the receive message queue (106a,b) with the ability to recover those messages in the event of failure.

An apply browser (104a,b), which in one embodiment is implemented as a thread reading from a receive message queue (106a,b), reads database transactions from the receive message queue (106a,b) for each CG until the apply browser's memory is full or enough transactions have been read to allow the apply process to continue without interruption. The apply browser (104a,b) then reports the maximum database commit Log Sequence Number (LSN) available in the receive queue for all other apply programs to see.

In one embodiment for a RDBMS (108), the apply program uses the MSGSYNC table (102) for MCG coordination with all other apply programs in a data sharing group. The MSGSYNC table (102) is accessible from all system in the computer complex. In one embodiment, there is only one MSGSYNC table (102) per data sharing group, regardless of the number of CGs, apply programs and data sharing members. Messages delivered to the target contain the LSN of the commit at the source. There is no need for participating members to know how many other data sharing members are involved in the synchronization. Each apply program is only interested in the smallest "update time timestamp" across all participating apply processes, irrespective of the number of data sharing members.

In log capture/transaction replay technology, there is a log capture program at the source that reads the DBMS recovery logs, extracts the transaction data, and sends those transactions over one or several channels to an apply program at the target that reconstructs DBMS statements using the values that were extracted from the source DBMS log. The log capture program communicates with the apply program using persistent messages over a message system that provides guaranteed delivery and failure recovery. Persistence of the messages at the target (i.e., the ability to ensure that messages are 'safely received' and recoverable, should the system crash at the target, is essential to this solution. It guarantees that eventual consistency can always be reached, even if a source or transmission channel is permanently lost.

When there are no changes replicated from the source for a CG, the source DBMS log capture program sends a heartbeat message that contains the last commit LSN detected in the database log, or the current time if the End-Of-Log (EOL) has been reached. Thus, this solution relies on a commit LSN sequence rather than commit timestamps for synchronized apply program, due to potential duplicates for commit timestamps on the data sharing group. In one embodiment, the Q Capture ensures prevention of duplicates for commit LSN sequence numbers by appending an extra sequence number to the LSN from the database log.

Each apply program uses a pool of agents (110a,b) to apply transactions in parallel to the user tables, up to the database source commit LSN that is available for all apply programs for all CGs. The apply browsers (104a,b) keep reading ahead from the MCGSYNC table (102) to determine the next maximum commit LSN available.

In a MCG synchronized mode, the apply program (112a, b) applies transactions in batches. The read-ahead by the apply browsers (104a,b) ensures pipelining of incoming transactions for the pool of agents (110a,b) to process. The wait time by a CG because of synchronization overhead is negligible because of the pipelining achieved by the apply browsers (104a,b).

The apply program must have sufficient memory to read ahead enough messages for keeping all agents in the agent pool (110a,b) busy. In one embodiment, a batch-size upper limit is determined at regular checkpoints, for example, about every 500 ms. More transactions that can be applied during that checkpoint interval can be pre-fetched into memory, such that they are ready to be applied when the syncpoint advances.

Various embodiments can have different synchronization modes. In an "unbridled synchronization mode," the apply programs proceed as long as data is received for all CGs up to a common maximum commit timestamp, even if one apply is 'stuck' behind (e.g., an apply agent waiting on a database lock). It is often tolerable for one apply to proceed, because data is persisted and consistency can be established before failover by finishing to apply all receive queues (106a,b). However, it should be noted that this also allows for more variations in data currency between CGs, until all apply programs have caught up. For example, one apply might be 'stuck behind' by minutes, while other apply programs proceed.

In an "in-step synchronization mode," the apply programs do not apply transactions that were committed at the source more than N milliseconds apart. Thus, a "slow apply" might slow down all apply programs for all CGs, even if data has been received and persisted in the receive queues for all apply programs and CGs. The in-step synchronization mode reduces the impact of replication latency differences between CGs.

Ensuring Timestamp Availability for Synchronization

In order for the synchronization mechanisms to work and to ensure transaction consistency at failover after a disaster, it is important to ensure that timestamps are available for synchronization. In one embodiment, this is accomplished as follows.

A heartbeat is provided with a granularity of milliseconds. The value provided in the heartbeat message is either the last commit time, or the last time the log capture program read the end-of-log (EOL) time. When reading an EOL, the log capture program sends a heartbeat message with the current time. The heartbeat message includes a last commit LSN sequence read from the database logs.

When there are no transactions for any subscribed table during the heartbeat interval and the EOL was not reached, the heartbeat message includes the last commit LSN sequence read from the database logs. The reason for this is that otherwise, applying the oldest transaction (oldest_trans) would not advance until EOL is reached. The log capture program must send a timestamp as it might be reading log records from transactions that modify data replicated by other capture programs. If two or more captures are applied for different tables, this can hold back oldest_trans for one of the log capture programs, because the log capture program keeps reading log records for tables subscribed to by other captures, but the log program sends the last commit it had encountered for its own subscribed tables only when hitting EOL All messages in the replication communication protocol between Capture and Apply must send a maximum commit LSN. This includes, for example, DDL changes (e.g., for create table, add column, alter data type, and so on), starting replication for a table, adding a table to an existing CG, and messages for changes in replication settings.

Data Structures for Controlling and Monitoring the Synchronization Process

As was described above, in one embodiment, communication across apply programs for synchronization is done using database tables. In another embodiment, shared memory is used. FIG. 2 shows a more detailed view of the MSGSYNC table (102) of FIG. 1.

In order to report the maximum commit read by one apply program, each apply program (112a,b) reads ahead its receive queues (106a,b), until the apply program has filled up its memory budget or determined that enough transactions have been read for keeping agents busy until the next checkpoint. At that point, the apply program (112a,b) reports the maximum LSN available into the MAX_COMMIT_SEQ_READ field of the MCGSYNC table (102). Each participating apply program (112a,b) updates a row for each CG that it replicates (one apply program can support multiple CGs) at intervals that are never longer than message synchronization interval. The updates to the row contains either the maximum commit LSN read from the receive queue (106a,b) but not yet applied, for each CG, or the maximum commit LSN for which it is known that any prior transactions has been processed for the CG.

The MAX_COMMIT_SEQ_READ field is updated as follows when one of the situations below occurs:
  When the memory is full, the MAX_COMMIT_SEQ_READ field is updated with the commit sequence of the highest transaction read in memory.
  Prior to processing a single DBMS transaction that is so large that it exceeds all memory available for the Apply program. In some environment, a single DBMS transaction sometimes modify several Gigabytes of data before a commit. This is referred to as a 'monster' transaction. The MAX_COMMIT_SEQ_READ field is updated with (commit timestamp of the monster—1 ms). This is because a monster transaction must be applied before all messages for the transaction can be read (since the messages do not fit in memory), and the last messages might be lost. However, it is guaranteed that any transaction with a commit timestamp smaller than this monster transaction timestamp has been applied to this queue, so therefore, it is safe to tell the other CGs to proceed up to the point just prior to the commit.
  When committing a monster transaction, the MAX_COMMIT_SEQ_READ field is updated with the monster commit_seq.
  When receiving a heartbeat message and no other transaction messages have arrived during the message synchronization interval.
  When receiving a control message, e.g., schema, load done and no other messages (requires capture changes)
  When receiving a DDL message and no other messages in the MCGSYNCINT, with the commit timestamp minus 1 ms.

In one embodiment, the timestamp for the "oldest transaction applied" can be determined as follows. When there are in-flight transactions, the OLDEST_TRANS reported in MCGSYNC table contains a timestamp just below (e.g., by 1 microsecond) the commit timestamp of the "OLDEST INFLIGHT TRANS" whenever there are in-flight transactions. The reason for this is that the OLDEST_INFLIGHT_TRANS on each of the participating CGs could end up being just beyond the "MIN(OLDEST_PROCESSSED_TRANS)+MCGSYNCSTEP" value used as the "NEXT_APPLYUPTO_TIME." Typically when Q Capture is not lagging behind in the database log, any two widely separated transactions would usually have one or more heartbeat messages occur between them. As long as heartbeat messages arrive, the next In-Step Applyupto point will advance. Now, if two source transactions T1 and T2 are separated by more than MCGSYNCSTEP, and there are no heartbeat messages between them, the next In-step Applyupto point might get stuck at "T1+MCGSYNCSTEP." Setting HEARTBEAT_INTERVAL<MCGSYNCSTEP to ensure heartbeat between T1 and T2 cannot guarantee a heartbeat if a lagging Capture on catch-up sees both T1 and T2 within a single heartbeat interval. Using OLDEST_PROCESSED_TRANS for MCG synchronization in this case, could lead to all browsers waiting forever for next "applyupto" point to increase. Therefore, using "OLDEST_INFLT_TRANS−1 microsecond" when available, instead of the "OLDEST PROCESSED TRANS" for MCGSYNC, ensures at least one of the browser/QMAPs will always be able to make progress, since MCGSYNCSTEP>>1 microsecond.

In one embodiment, determining the next applyupto point for each CG can be done as follows. Each apply browser determines the next 'applyupto' point by selecting from the Next_Applyupto_Time filed in the MCGSYNC table at regular intervals. All Apply programs have read at least to the APPLYUPTO point. If the selected "Next_Applyupto_Time" happens to be an uncommitted read (UR), this is not an issue, as the value will be picked up at the next MSCSYNCINT. In one embodiment, the MSGSYNC table (102) is defined with one page per row and resides in memory. As was described above, each Apply browser does not need to know how many other Apply browsers are participating. The Q Browser omits the MCGGSYNC entry pertaining to itself (i.e., its QMAP). This is because each browser (104a,b) only needs to maintain the in-step distance from other browsers and not itself. If this were not the case, the slowest browser may end up needlessly pacing its own progress by the in-step amount every MCGSYNC refresh interval, and slow down overall replication. In one embodiment, for In-step MCG, the Next stop point is the older of the "MIN(max_cmt_time_read)" value and the "MIN(oldest_trans)+MCGSYNC-STEP milliseconds" value.

Ensuring Consistency at Restart of the Capture Process

When there is more than a single CG, log capture for all CGs must be stopped at exactly the same commit point in the database log. Otherwise, if a transaction changes multiple tables, a Capture that is ahead of other Capture programs could be sending the portion of this transaction for the tables it is replicating, and the other Capture programs could stop before sending changes for other tables in this transaction, resulting in data inconsistency at the target. By stopping all capture programs at exactly the same point in the DBMS log, all tables are captured and replicated for the transactions. Stopping and subsequently restarting replication does not require suspending the workload for any period of time.

In one embodiment, this is accomplished by inserting a row into a special table for which the capture program detects log records in the DBMS logs. Commands can thus be passed to the capture program that can be executed in line while reading the logs. This table is referred to as the SIGNAL table (not shown in FIG. 1). The columns for a row of the SIGNAL table contain a command name and its parameters, e.g., a STOP command. All capture programs can be stopped at exactly the same point in the database logs, despite the fact that each capture program reads the logs at its own speed, by inserting STOP signals for each capture in the same DBMS transaction. When the capture program reads the log record for this insert, it stops. Because all inserts for this stop command are in the same database transaction, that is, they share a common commit timestamp, the inserts stop at exactly the same point in the DBMS log and persist this stopping point for a subsequent restart.

In another embodiment, stopping all captures at the same point in the DBMS recovery log is done by first getting a timestamp in the future, and then issuing a stop command to each capture, which includes the commit timestamp at which the capture should stop. No transaction with a larger commit timestamp than this stop timestamp will be captured before stopping. This ensures restart-ability at exactly the same point in the log for all consistency groups. The timestamp supplied must be in the future in relation to the time the command is received.

Taking Synchronization Points at the Target for Backout Support

Taking a syncpoint of the apply process requires a drain, during which parallelism might be gradually reduced until the syncpoint has been reached across all CGs. The techniques described herein allows a pipelining of work across all queues, by minimizing the wait for other apply processes to complete their syncpoint, for optimizing the amount of time where maximum parallelism is possible, taking into account workload characteristics.

Each CG forces a syncpoint periodically based on source commit time increments. In one embodiment, the "MIN (OLDEST_TRANS)+a fixed step value (FORCE_SYNC_STEP)" is used as the next force syncpoint. In this embodiment, the FORCE_SYNC_STEP has a granularity of seconds and is thus configured much greater than the heartbeat and any INSTEP values. Any transaction whose source commit timestamp exceeds the current force syncpoint is held off from being applied/scheduled to agents.

When each CG reaches the force syncpoint (i.e., when all source transactions up to the syncpoint timestamp have been applied) the apply-side commit timestamp is recorded together with the source syncpoint timestamp (in a syncpoint history table). It then waits for all other CGs to reach the same syncpoint.

Once all CGs have reached the force syncpoint, then a new force syncpoint comes into effect, as "MIN(OLDEST_TRANS)+FORCE_SYNC_STEP." The CGs proceed with applying transactions based on the new syncpoint. The DBMS rollback point for disc sync will be "MAX(apply commit timestamp)" for the nearest syncpoint that was reached across all CGs.

In one embodiment, a history of at least two force syncpoints (current & previous) is maintained. If there is a crash before the current syncpoint has been reached across all CGs then the previous syncpoint can be used for the database backout. In one embodiment, a history of syncpoints is preserved, allowing for backing out to any previous consistency point.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restoring transaction consistency across consistency groups between a first and a second independent database management systems for a disaster recovery, wherein the first and second independent database management systems operate in an active/active configuration, comprising:

defining a plurality of consistency groups, wherein each consistency group in the first and the second database management systems includes system, middleware and application volumes to be managed as a consistent entity, and wherein each consistency group in the first database management system uses a separate transmission channel to transmit data changes pertaining to the consistency group to a corresponding consistency group at the second database management system;

in response to the second database management system having received data from log records from the first database management system, identifying a timestamp representing a most recently received commit log record and storing the timestamp in a database table;

comparing the timestamp with timestamps for other consistency groups to identify a lowest common commit point representing a common time at which data to be applied to the consistency groups in the second database management system have been received into a recoverable data store; and applying the received data to the consistency groups in the second database management system up to the identified lowest common commit point.

2. The method of claim 1, wherein applying the received data to the consistency groups in the second database management system is performed only in response to having received timestamps for each consistency group in the second database management system.

3. The method of claim 1, further comprising:

sending a heartbeat message with a timestamp greater than a last replicated commit timestamp for a consistency group in response to determining that there is no data to replicate for the consistency group.

4. The method of claim 1, further comprising:

temporarily persisting the received data in a recoverable staging area; and independently selecting from the staging area, by two or more replication apply programs, subsets of the received data to be applied to the consistency groups in the second database management system.

5. The method of claim 4, wherein the recoverable staging area is located in one of: the second database management system, and in a queuing system.

6. The method of claim 4, wherein:

the replication apply programs are operable to suspend an apply in response to data having been applied up to the identified lowest common commit point, and the suspended apply lasts until the replication apply programs determine a subsequent lowest common commit point to which changes are to be applied.

7. The method of claim 4, further comprising:

monitoring the state of the staging area to determine whether the lowest common commit point for which all messages containing sub-transactions to be applied in the second database management system has been received.

8. The method of claim 7, further comprising:

in response to determining that the lowest common commit point for which all messages containing sub-transactions to be applied in the second database management system have been received, notifying the other participant apply programs and applying, by the replication apply programs the subsets of data to the consistency groups in the second database management system.

9. The method of claim 1, further comprising:

prior to failover for a disaster from the first database management system to the second database management system, discarding changes beyond the lowest common commit point among all transmission channels.

* * * * *